(12) United States Patent
Suruga

(10) Patent No.: US 9,776,253 B2
(45) Date of Patent: Oct. 3, 2017

(54) TOOL HOLDING STRUCTURE

(71) Applicant: Daishowa Seiki Kabushiki Kaisha, Higashiosaka-shi, Osaka (JP)

(72) Inventor: Hirokazu Suruga, Higashiosaka (JP)

(73) Assignee: DAISHOWA SEIKI KABUSHIKI KAISHA, Higashiosaka-shi, Osaka (JP)

( * ) Notice: Subject to any disclaimer, the term of this patent is extended or adjusted under 35 U.S.C. 154(b) by 122 days.

(21) Appl. No.: 14/651,987

(22) PCT Filed: Mar. 5, 2013

(86) PCT No.: PCT/JP2013/055991
§ 371 (c)(1),
(2) Date: Jun. 12, 2015

(87) PCT Pub. No.: WO2014/103350
PCT Pub. Date: Jul. 3, 2014

(65) Prior Publication Data
US 2015/0321264 A1 Nov. 12, 2015

(30) Foreign Application Priority Data
Dec. 28, 2012 (WO) .................. PCT/JP2012/084131

(51) Int. Cl.
*B23B 31/113* (2006.01)
*B23B 31/00* (2006.01)
*B23B 31/117* (2006.01)

(52) U.S. Cl.
CPC .......... *B23B 31/113* (2013.01); *B23B 31/005* (2013.01); *B23B 31/117* (2013.01);
(Continued)

(58) Field of Classification Search
CPC .... B23B 2231/0284; B23B 2231/0268; B23B 2231/0264; B23B 2270/60;
(Continued)

(56) References Cited

U.S. PATENT DOCUMENTS 481,462 A * 8/1892 Benson ...................... F16B 7/20
279/93
1,305,311 A * 6/1919 Sheldon et al. ........ F16B 21/02
279/93
(Continued)

FOREIGN PATENT DOCUMENTS

CN 1644325 A 7/2005
DE 2408625 A1 * 8/1974 ........... B23B 31/005
(Continued)

OTHER PUBLICATIONS

Office Action of corresponding Chinese Patent application No. 201380068073.8 issued Jul. 14, 2016.
(Continued)

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

Provided is a tool holding structure capable of effectively preventing a cutting tool from coming off a chuck portion. An outer fitting portion A is formed in an outer face of a shank portion 2 of a cutting tool T and an inner fitting portion B is formed in an inner face of a chuck portion 12 of a tool holder. A fitting member 20 is provided to be fitted to the outer fitting portion A and the inner fitting portion B respectively. The fitting member 20 includes a protruding portion 22 which protrudes from an outer circumference of the shank portion 2 when fitted to the outer fitting portion A. A guide groove 18 is formed for guiding the protruding portion 22 of the fitting member 20 from an open side of an inner space 13 to the inner fitting portion B. The inner fitting portion B includes a rotation preventing face for preventing relative rotation between a holder body 10 and the cutting tool T in association with contact thereof with the protruding portion 22 and a slip-out preventing face for preventing
(Continued)

slip-out of the cutting tool T in association with contact thereof with the protruding portion 22.

2 Claims, 8 Drawing Sheets

(52) U.S. Cl.
CPC ............... *B23B 2231/0268* (2013.01); *B23B 2231/0284* (2013.01); *Y10T 279/17888* (2015.01); *Y10T 279/3481* (2015.01)

(58) Field of Classification Search
CPC .............. B23B 31/1078; B23B 31/107; B23B 31/1074; B23B 31/113; B23B 2231/46; B23B 31/003; B23B 31/117; Y10T 279/17761; Y10T 279/17888; Y10T 279/3481
See application file for complete search history.

(56) References Cited

U.S. PATENT DOCUMENTS

| | | | | |
|---|---|---|---|---|
| 3,380,746 | A | * | 4/1968 | Benjamin ............. B23B 31/113 279/91 |
| 3,588,135 | A | * | 6/1971 | Porter .................. B23B 31/113 279/83 |
| 3,703,113 | A | | 11/1972 | Feisel |
| 4,265,460 | A | | 5/1981 | Senzaki |
| 2003/0156899 | A1 | | 8/2003 | Penaranda et al. |
| 2005/0110225 | A1 | | 5/2005 | Kleine et al. |
| 2009/0179368 | A1 | * | 7/2009 | Haimer ................. B23B 31/005 269/54.2 |

FOREIGN PATENT DOCUMENTS

| | | |
|---|---|---|
| DE | 102010006918 A1 | 8/2011 |
| GB | 1354365 A | 5/1974 |
| JP | S55-018355 A | 2/1980 |
| JP | H01-99513 U | 7/1989 |
| JP | H07-100705 A | 4/1995 |
| JP | H10-100009 A | 4/1998 |
| JP | 2002-355727 A | 12/2002 |
| RU | 2 248 740 C2 | 3/2005 |
| RU | 2 357 837 C1 | 6/2009 |
| SU | 1071377 A | 2/1984 |

OTHER PUBLICATIONS

Translation of Written Opinion of the International Searching Authority for PCT/JP2013/055991 mailed on Jul. 9, 2015.
International Search Report of PCT/JP2013/055991 mailed Apr. 2, 2013.
Decision to Grant dated Jan. 12, 2017 which issued in corresponding Russian application No. 2015131101/02 (047914).

* cited by examiner

TOOL HOLDING STRUCTURE

CROSS REFERENCE TO RELATED APPLICATIONS

This application is a national stage of International Application No.: PCT/JP2013/055991, which was filed on Mar. 5, 2013, and which claims priority to PCT/JP2012/084131 which was filed on Dec. 28, 2012, and which are both herein incorporated by reference.

TECHNICAL FIELD

The present invention relates to a tool holding structure including a fitting member which is fitted to an outer fitting portion provided in an outer face of a shank portion of a cutting tool and an inner fitting portion provided in an inner face of a chuck portion to which the shank portion of this cutting tool is inserted.

BACKGROUND ART

As an example of such tool holding structure described above, e.g. Patent Document 1 discloses a structure wherein a pin insertion hole is provided as an inner fitting portion in an end face of a chuck portion (disclosed as a chuck cylinder in the above document) to extend through this end face. With this tool holding structure, in the chuck portion, a fitting member (disclosed as a lock pin in the document) is fitted from the outside of the chuck portion to the inner fitting portion, such that the fitting member is exposed in an inner space of the chuck portion. On the other hand, the shank portion includes, in its outer circumference, a cylindrical outer fitting portion (disclosed as a pin engaging groove in the document) to which the fitting member is to be fitted.

According to the above-described arrangement of Patent Document 1, after the fitting member is inserted to the inner fitting portion of the chuck portion, the chuck portion is heated to be expanded, into which the shank portion is inserted and then cooled together. Thus, with fitting between the chuck portion and the shank portion as well as fitting between the outer fitting portion and the fitting member through shrink-fits, the cutting tool is mounted. With this arrangement, when the cutting tool is exposed to application thereto of a force which tends to slip off this tool, the fitting between the outer fitting portion (pin engaging groove) of the shank portion and the fitting member prevents slip-out. Further, when the cutting tool tends to be rotated relative to the chuck portion, the fitting member prevents such relative rotation of the cutting tool relative to the chuck portion.

As another tool holding structure, Patent Document 2 discloses a structure wherein a rotatably driven base body (corresponding to a chuck portion) defines an inner space to which a shank portion of a drill bit can be inserted. In this inner space, there is formed an engaging protrusion (corresponding to a fitting member) which protrudes to the inner side of the space; whereas, in an outer face of the shank portion of the drill bit, there are formed a guide groove extending along a longitudinal direction of the drill bit, and an engaging groove disposed parallel with the guide groove and having a predetermined length whose intermediate portion is continuous with the guide groove. Further, in the inner space, there is provided a spring configured to urge the drill bit in a push-out direction.

With the above-described arrangement disclosed in Patent Document 2, for attaching the drill bit to the base body, the shank portion of this drill bit will be inserted with keeping the guide groove of the drill bit in positional alignment with the base body. Thereafter, the drill bit will be rotated to bring the engaging protrusion into the engaging groove, upon which the drill bit will be displaced in the protruding direction by the urging force of the spring, and the engaging protrusion will come into engagement with an end portion of the engaging groove. With this, slip-out of the drill bit from the base body is restrained and also transmission of a rotational torque from the body portion to the drill bit becomes possible.

BACKGROUND ART DOCUMENTS

Patent Documents

Patent Document 1: Japanese Unexamined Patent Application Publication No. 2002-355727
Patent Document 2: Japanese Unexamined Patent Application Publication No. 10-100009

SUMMARY

Problems to be Solved by Invention

In the arrangement disclosed in Patent Document 1, in order to prevent inadvertent detachment, i.e. coming-off, of the fitting member from the chuck portion, a female thread is formed in the insertion hole and a male thread is formed in the fitting member, to be threaded to each other. With this arrangement, as the insertion hole extends through the outer face of the chuck portion, the strength of this chuck portion is reduced. Further, working is troublesome for forming the female thread in the insertion hole and forming the male thread in the fitting member.

To cope with such inconvenience as above, as suggested in Patent Document 2, it is conceivable to form an engaging protrusion in the inner face of the chuck portion and an engaging groove in the cutting tool respectively, so as to facilitate attachment and detachment of the cutting tool. This latter arrangement, however, requires formation of the engaging groove and the guide groove in the cutting tool whish per se is a disposable item, so the number of steps for producing the cutting tool is increased. In this respect, there remains room for improvement.

The present invention is provided for a cutting tool which is exposed to a force effective in a slip-out direction at the time of a cutting work with e.g. an end mill and the object of the invention is to provide a tool holding structure for such tool which structure can effectively prevent coming-off of the cutting tool from a chuck portion when a clamping force of this chuck portion alone is insufficient to withstand an excessive load of the force, against slip-out.

Solution

According to a characterizing feature of the present invention, a tool holding structure comprises:

a fitting member to be in positional alignment with an outer fitting portion provided in an outer face of a shank portion of a cutting tool;

a chuck portion having a cylindrical inner face capable of receiving the shank portion and the fitting member;

a guide groove formed in the inner face and extending from an opening side end portion of the chuck portion toward a far side thereof; an inner fitting portion formed continuously with the guide groove to be fitted with the fitting member; and the inner fitting portion including a rotation preventing face to which the fitting member comes into contact in a direction of the shank portion being rotated relative to the chuck portion by a load of a cutting work and a slip-out preventing face to which the fitting member comes into contact in a direction of the shank portion being slipped out from the chuck portion.

With the above-described arrangement, the fitting member is placed in positional alignment with the outer fitting portion of the shank portion of the cutting tool and then this fitting member, together with the shank portion, is inserted along the guide groove from the opening side end portion of the inner space of the chuck portion. Then, the fitting member is fixed in position, by the outer fitting portion, to the shank portion and can be inserted along the guide groove into the chuck portion and also its movement in a direction different from the direction of the above insertion, e.g. in a circumferential direction, is prevented. Accordingly, the cutting tool is guided to the inner fitting portion provided on the far side of the guide groove, with its rotation relative to the chuck portion being effectively prevented. Next, as the cutting tool is rotated in the direction opposite the direction of its rotation at the time of a cutting work, the fitting member comes into contact with the rotation preventing face of the inner fitting portion. With this, even if the cutting tool tends to be rotated relative to the chuck portion at the time of a cutting work, such rotation of the cutting tool is effectively prevented as the fitting member is placed in contact with the rotation preventing face of the inner fitting portion. Further, when the cutting tool is exposed to a force which is effective to slip the tool out of the chuck portion, such slip-out of the cutting tool is effectively prevented as the fitting member comes into contact with the slip-out preventing face of the inner fitting portion.

Furthermore, the cutting tool usable in the present invention includes those commonly called "Weldon shank" such as JIS B4005, DIN 1835-1, ASME B94 19, ISO 3338-2, etc., which are pre-equipped with a shank outer fitting portion in accordance with established Japanese, European, U.S. standards or the international standard provided by the International Organization for Standardization. As these are readily available and require no additional work in the shank portion, the cutting tools can be prepared inexpensively.

Consequently, there has been realized a cuter holder which allows attachment of a cutting tool with reliable prevention of coming-off thereof from the chuck portion and which allows also reliable prevention of relative rotation between the chuck portion and the cutting tool.

In the present invention, preferably, a hole portion parallel with an axis of the chuck portion is formed from the end face portion on the opening side of the chuck portion and a portion of a bar-like member inserted to the hole portion is exposed inside the inner fitting portion, the exposed portion of the bar-like member constituting the rotation preventing face.

As described above, as the rotation preventing face to which the fitting member comes into contact is formed by the bar-like member inserted to the hole portion of the chuck portion, the rotation preventing face can be provided only by determining the setting position of the bar-like member. More particularly, in the case of an inner fitting portion which is formed by cutting, a cutting work will be needed to provide the rotation preventing face at a predetermined position and in a predetermined shape. On the other hand, in the case of the above arrangement where the bar-like member forms the rotation preventing face, it is possible to form the rotation preventing face in the bar-like member in advance. Then, the rotation preventing face can be formed only by inserting this bar-like member to the hole portion. Moreover, through appropriate selection of a material forming the bar-like member, the strength and/or friction resistance of the rotation preventing face can be further enhanced. And, it can also be readily replaced when worn out.

In the present invention, preferably, the structure further comprises an urging mechanism for urging the cutting tool in a direction to push out this tool toward the far side of the chuck portion.

With this arrangement, when the shank portion of the cutting tool is inserted to the chuck portion and the fitting member is fitted to the inner fitting portion, an urging force is applied by the urging mechanism to the shank portion in the push-out direction, so that the fitting member can be set in contact with the slip-out preventing face.

In the present invention, preferably, the urging mechanism has a friction contact allowing rotation with a face to which the shank portion comes into contact.

With the above-described arrangement, when the fitting member of the cutting tool is rotated in the direction to come into contact with the rotation preventing face at the time of a cutting work, this rotational force, through the friction contact, can cause the urging mechanism to apply a force to the shank portion in the push-out direction.

In the present invention, preferably, a collet is interposed between the shank portion of the cutting tool and the chuck portion.

EMBODIMENTS

Next, embodiments of the present invention will be explained with reference to the accompanying drawings.

[Tool Holder and Cutting Tool]

Figure 1:
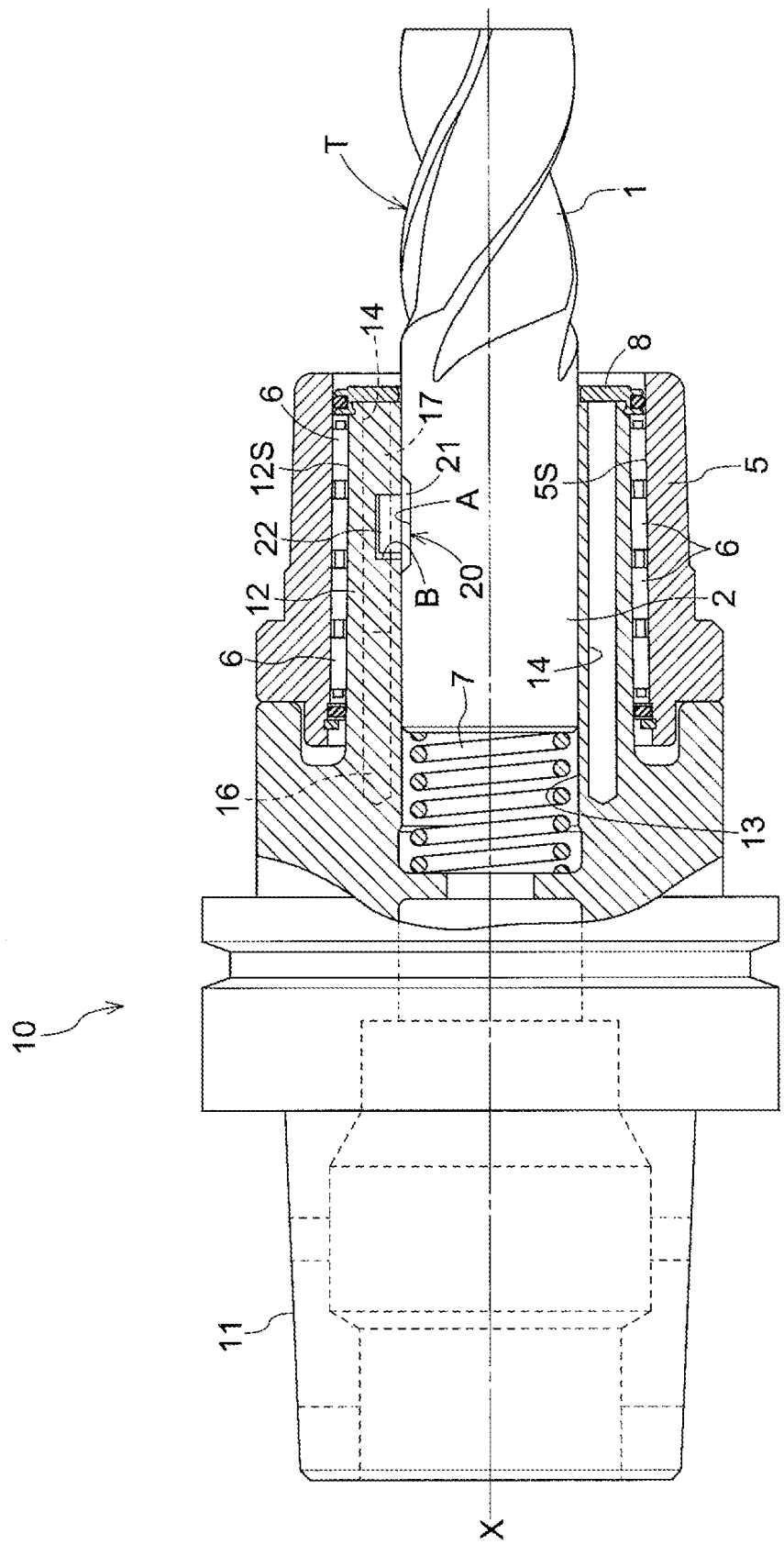
FIG. 1 is a section view of a tool holder when a cutting tool is attached thereto.
Figure 2:
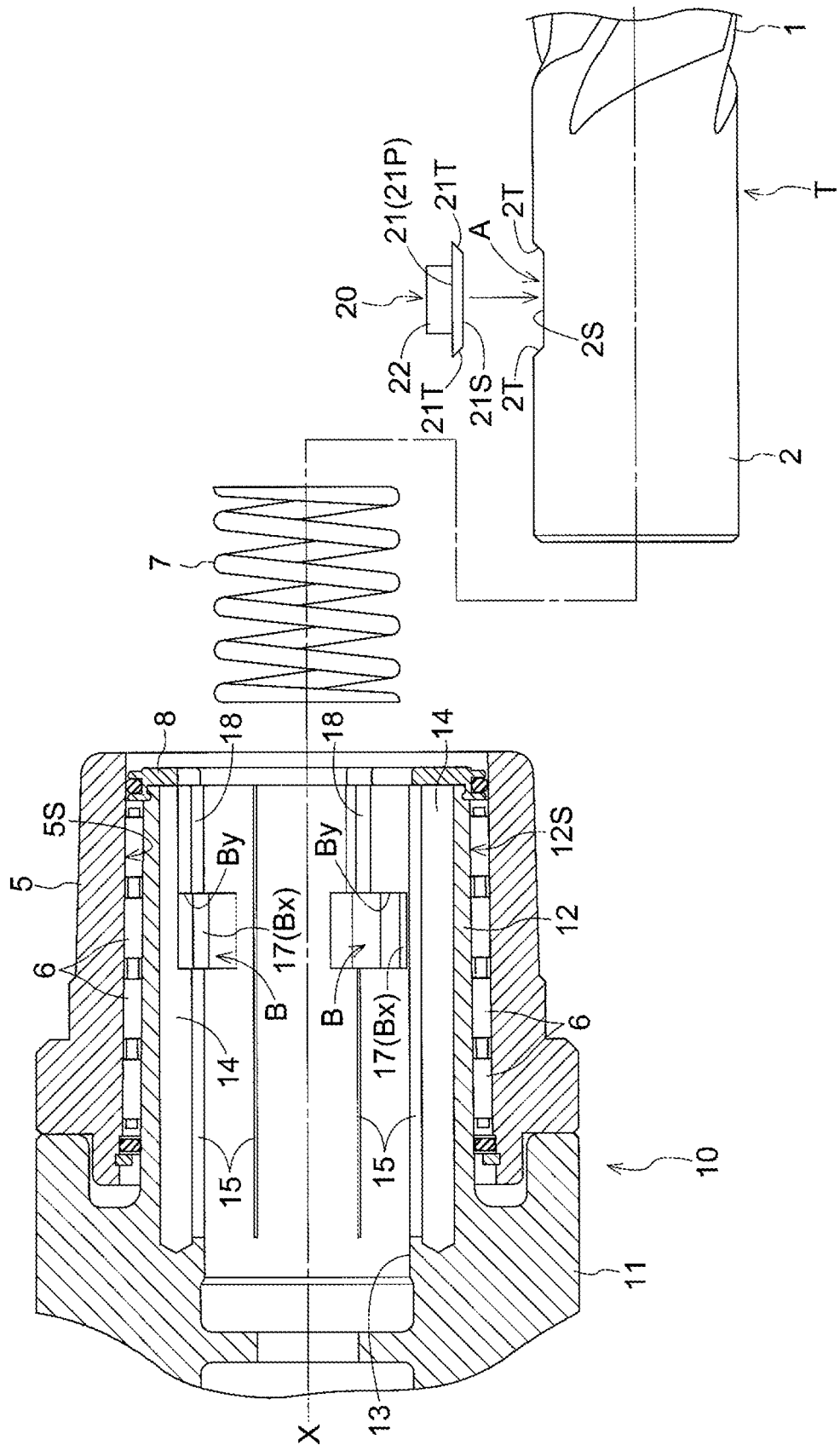
FIG. 2 is a section view showing the tool holder and the cutting tool being detached from each other.
Figure 3:
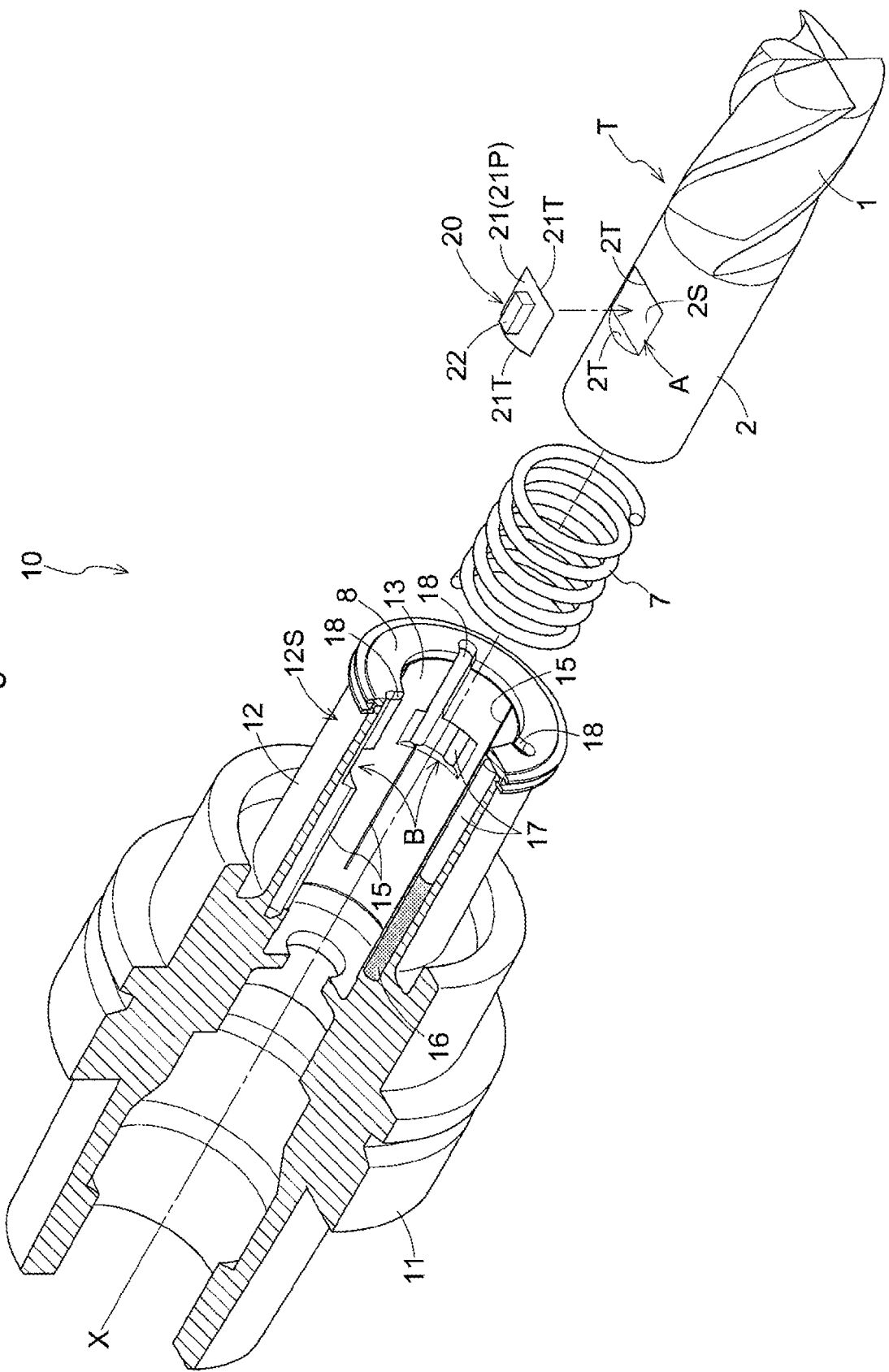
FIG. 3 is an exploded perspective view showing the tool holder, the cutting tool and a fitting member.

As shown in FIGS. 1 through 3, a tool holder as a specific example of a tool holding structure, includes a holder body 10 having a tapered attaching portion 11 to be attached to a rotary work machine by being fitted thereto and a chuck portion 12 to which a cutting tool T is to be inserted, and a fastener ring 5 fitted on a tapered outer circumferential face 12S of the chuck portion 12.

The tool holder as a whole has a cylindrical shape centered about its axis X. When this tool holder is attached to this rotary work machine, the tool holder is rotated about the axis X. Inside the chuck portion 12, there is formed a cylindrical inner face-like inner space 13 centered about the axis X.

The cutting tool T includes a blade portion 1 for carrying out a cutting work and a shank portion 2 which are formed integral with each other, and the shank portion 2 is inserted to the inner space 13 of the chuck portion 12. In the following explanation, the rotational center of the cutting tool T too will be explained as the axis X.

The tool holder according to the present invention, through use of a fitting member 20 which is fitted to an outer fitting portion A formed in an outer face of the shank portion 2 of the cutting tool T and also to an inner fitting portion B formed in the inner space 13 of the chuck portion 12, provides a function of preventing slip-out of the cutting tool T from this tool holder and preventing also relative rotation of the cutting tool T relative to this tool holder.

The outer fitting portion A is specified under an established standard, such that a fitting face 2S is formed by cutting flat a portion of the outer face of the shank portion 2 of the cutting tool T and a pair of inclined faces 2T are formed at positions continuous with opposed ends in the direction along the axis X. Incidentally, the shape of the fitting face 2S is not limited to flat shape, but can be recessed or concave shape, or a combination of a recessed/concave face and a flat face. In such case, an additional work will be done on the shank portion and a fitting member dedicated thereto will be employed.

An inner circumferential face 5S of the fastener ring 5 is formed parallel with an outer circumferential face 12S of the chuck portion 12 and a plurality of needle rollers 6 are disposed therebetween. These multiple needle rollers 6 are disposed on the axis in a spiral layout along the outer circumference of the outer circumferential face 12S of the chuck portion 12. In operation, when the fastener ring 5 is rotated in a predetermined direction, these needle rollers 6 are revolved about the axis X while being rotated at the same time about the axes of their own along the outer circumferential face 12S of the chuck portion 12. With this, these multiple needle rollers 6 will ride over the outer circumferential face 12S of the chuck portion 12, thereby to apply pressures to the chuck portion 12, thus realizing reduction of diameter of the inner space 13.

Further, between the inner circumferential face 5S at each end portion of the fastener ring 5 and the outer circumferential face 12S of the chuck portion 12, a seal is provided, and to the opening side end of the chuck portion 12, there is attached a ring plate 8 for holding the seal.

[Holder Body]

Figure 4:
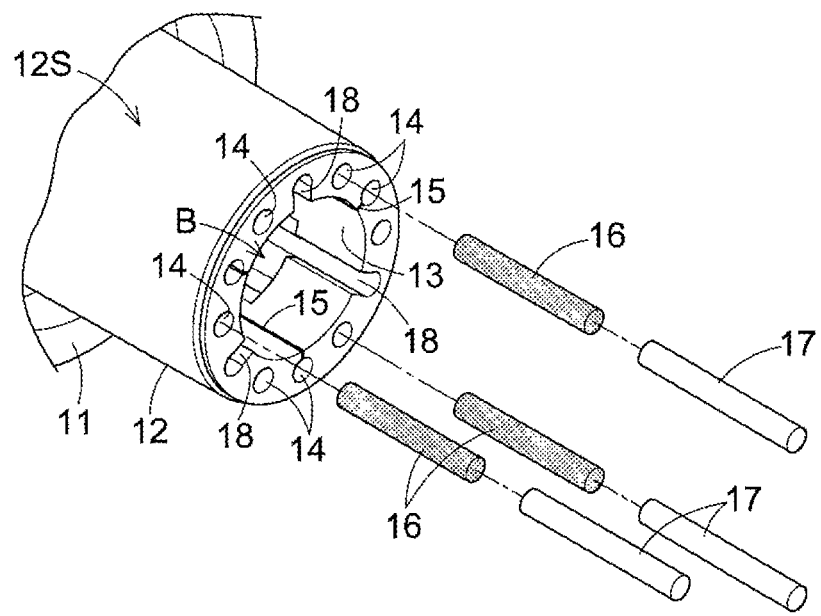
FIG. 4 is a perspective view showing hole portions formed in a chuck portion, positioning members and pins.
Figure 5:
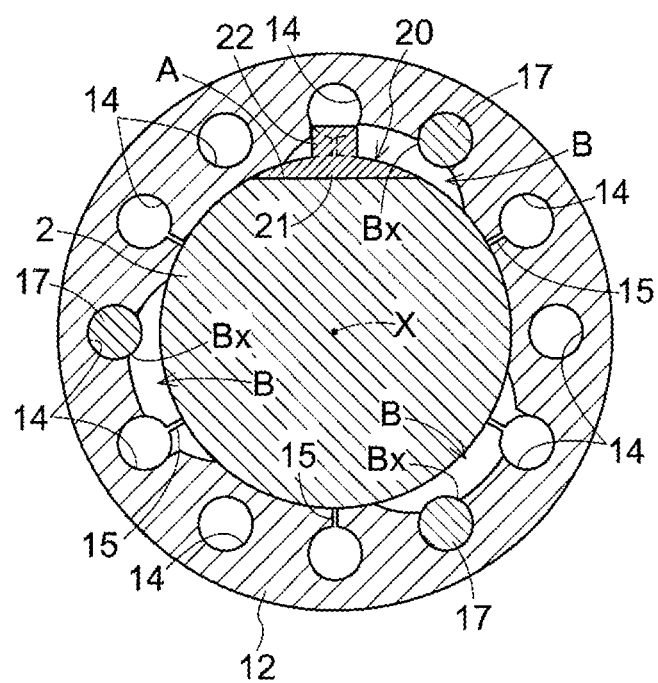
FIG. 5 is a section view showing the fitting member and the chuck portion at the time of insertion of the cutting tool.
Figure 6:
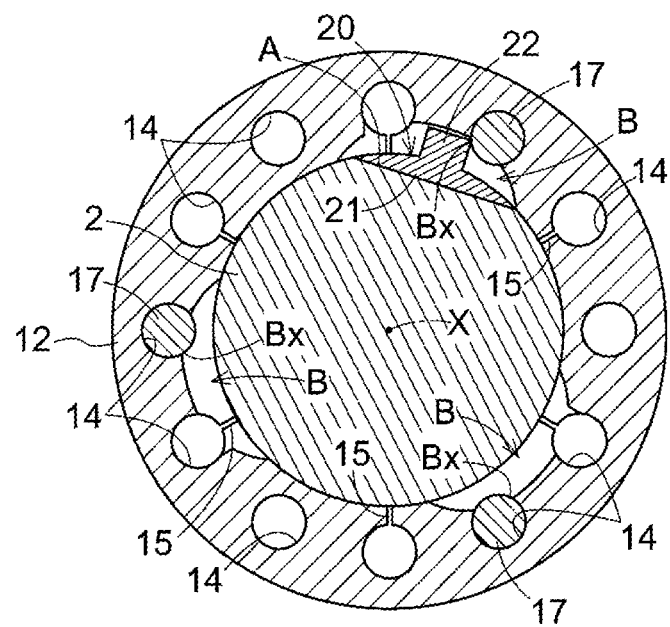
FIG. 6 is a section view showing the fitting member and the chuck portion at the time of rotation of the cutting tool.

As shown in FIG. 4, FIG. 5 and FIG. 6, from the end face of the chuck portion 12 and at positions surrounding the inner space 13, there are formed a plurality of hole portions 14 oriented parallel with the axis X. And, between some of these multiple hole portions 14 and the inner space 13, slits 15 are formed. More particularly, relative to the chuck portion 12, nine or twelve hole portions 14 are formed, with those having the slits 15 and those not having the slots 15 being disposed in alternation in the circumferential direction about the axis X. With this, six slits 15 are formed altogether.

These slits 15 function as "slit grooves" for facilitating the diameter reduction of the inner space 13. The other hole portions 14 function to facilitate deformation of the chuck portion 12. Further, to the three hole portions 14 with no slits 15 being formed corresponding thereto, positioning members 16 provided as cylindrical rubber members are inserted and also pins 17 (an example of "bar-like member") which are formed of metal and have cylindrical shape are also inserted in fitting relation therewith. By these positioning members 16, longitudinal center portions of the pins 17 are exposed to the inner fitting portion B and also the opposed end portions are set at appropriate positions to be supported in the hole portions 14.

In the inner space 13 of the chuck portion 12, there is formed the inner fitting portion B into which the protruding portion 22 of the fitting member 20 described above is to be inserted. From the opening side end portion of this inner space 13 toward the inner fitting portion B, guide grooves 18 extending and oriented linearly along the axis X are formed. That is, from the open side end portion of the chuck portion 12 toward the far side thereof, there are formed the guide grooves 18 configured to allow movement of the fitting member 20, and from these guide grooves 18, the inner fitting portion B extends continuously. In particular, the inner fitting portion B is formed as a fitting space on the outer circumferential side of the inner space 13 and three of such fitting spaces are provided equidistantly along the circumferential direction and three of the above-described guide grooves 18 too are provided equidistantly along the circumferential direction.

Moreover, the ring plate 8 described above is disposed at a position covering the plurality of hole portions 14. This ring plate 8 defines a through hole having an inside diameter slightly larger than the inside diameter of the inner space 13 and openings each having substantially same shape as the cross sectional shape of each guiding groove 18 corresponding thereto.

Figure 7:
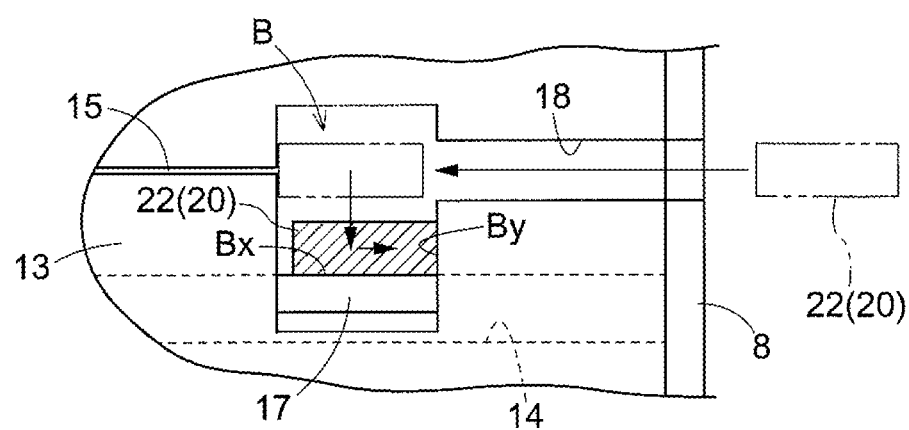
FIG. 7 is a section view showing a protruding portion inserted to a fitting space of the inner fitting portion.

The tool holder is assumed to be rotatably driven counterclockwise in FIG. 5 and FIG. 6 at the time of a cutting work. And, as shown in FIG. 7, the fitting space as the inner fitting portion B includes rotation preventing faces Bx to which the fitting member 20 comes into contact in the rotational direction of the shank portion 2 relative to the holder body 10 and slip-out preventing faces By to which the fitting member 20 comes into contact in the slip-out direction of the shank portion 2 relative to the holder body 10.

In the instant embodiment, when the tool holder is to be manufactured, the inner space 13 centered about the axis X will be formed inside the chuck portion 12 and the nine or twelve hole portions 14 will be formed. And, for six of the hole portions 14, the slits 15 are formed relative to the inner space 13. Further, at positions continuous with the inner space 13, three fitting spaces are formed and three guide grooves 18 are formed. Thereafter, as the pins 17 (an example of "bar-like member") are inserted to the three hole portions 14, these pins 17 are exposed inside the fitting spaces.

Figure 8:
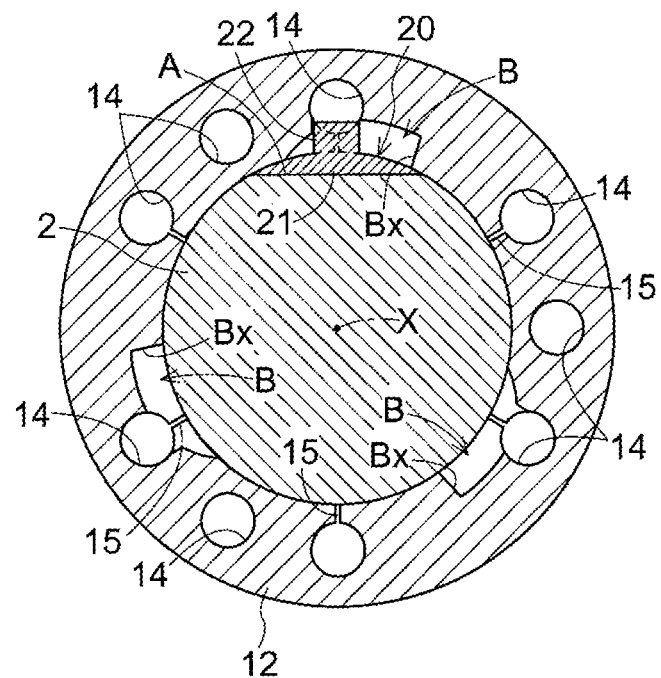
FIG. 8 is a section view showing the fitting member and the chuck portion at the time of insertion of the cutting tool.
Figure 9:
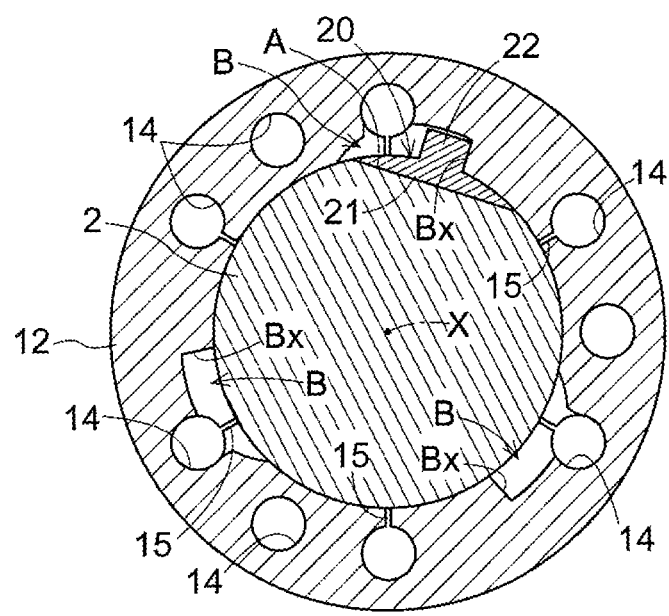
FIG. 9 is a section view showing the fitting member and the chuck portion at the time of rotation of the cutting tool.

With the above, portions of the pins 17 are exposed in the fitting spaces and the outer faces of these pins 17 exposed as described above can function as the rotation preventing faces Bx. In the present invention, as shown in FIG. 8 and FIG. 9, the rotation preventing faces Bx to which the protruding portion 22 of the fitting member 20 comes into contact can be formed by the inner face of the inner space constituting the inner fitting portion B, thus being formed integral with the chuck portion 12 (holder body 10). Further, as an alternative configuration of this rotation preventing faces Bx, it is also possible to employ a configuration in which a contact member formed of resin or metal, etc.

dedicated to such contact with the protruding portion 22 of the fitting member 20 is attached to the inner space of the inner fitting portion B. Namely, the rotation preventing face Bx provided in the present invention is not limited to providing members different from the chuck portion 12, such as pins 17, to the chuck portion 12 as shown in FIGS. 5 and 6, but can be a configuration as shown in FIGS. 8, 9 using the inner face of this chuck portion 12 (holder body 10) through molding of the inner space of the inner fitting portion B of the chuck portion 12. In particular, the shape of the rotation preventing face Bx formed by the inner face of the inner space need not be formed as a flat face to be placed in gapless contact with the lateral face of the protruding portion 22 as shown in FIGS. 8, 9, but can be a curved shape (shape with omission of the pin 17) as shown in FIGS. 5, 6, which face comes into contact with a portion of the lateral face of the protruding portion 22 so as to restrict occurrence of inconvenience of the protruding portion 22 biting into the face and becoming locked thereto in the event of strong contact with the protruding portion 22.

[Fitting Member]

As shown in FIGS. 1-3, the fitting member 20 includes a base portion 21 to be fitted onto the outer fitting portion A of the shank portion 2 and the protruding portion 22 protruding outwards, with the base portion 21 and the protruding portion 22 being formed integral with each other. The base portion 21 forms a flat fitting bottom face 21S and a pair of fitting inclined faces 21T at positions continuous therefrom in the direction of the axis X. With this configuration, when the fitting member 20 is fitted on the outer fitting portion A, the fitting bottom face 21S is placed in gapless contact with the fitting face 2S of the shank portion 2, the fitting inclined faces 21T are placed in gapless contact with the inclined faces 2T, and the protruding portion 22 protrudes from the outer circumference of the shank portion 2.

Further, in the base portion 21, an outer face portion 21P opposite the fitting bottom face 21S and surrounding the protruding portion 22 is formed like a circumferential portion continuous with the outer face of the shank portion 2, so that when the cutting tool T is attached to the tool holder, the outer face portion 21P of the fitting member 20 is placed in gapless contact with the inner face of the inner space 13 of the chuck portion 12.

[Fitting Mode]

With the above-described configuration, when the cutting tool T is to be attached to the tool holder, a spring 7 as an urging mechanism will be inserted in advance to the inner space 13 of the chuck portion 12. The fitting member 20 will be held to the outer fitting portion A of the shank portion 2 of the cutting tool T with positional alignment therewith through the fitting. Then, the shank portion 2 of the cutting tool T supporting the fitting member 20 as above will be inserted to the inner space 13.

Next, with the shank portion 2 of the cutting tool T being inserted in the inner space 13, the cutting tool T and the tool holder will be rotated relative to each other and one of the three guiding grooves 18 provided at the opening end of the chuck portion 12 will be selected and into the selected guide groove 18, the protruding portion 22 of the fitting member 20 will be inserted. With this insertion, the protruding portion 22 will be moved along the guide groove 18 and the inner end of the shank portion 2 will come into contact with the spring 7, so that an urging force thereof will be applied to the cutting tool T in its push-out direction. When the shank portion 2 of the cutting tool T is inserted to the inner space 13 in the manner described above, the fitting member 20 is kept fitted to the shank portion 2 and the protruding portion 22 of this fitting member 20 is fitted within the guide groove 18. Therefore, the cutting tool T will be maintained under a condition of this tool T not being rotated relative to the chuck portion 12.

And, after the protruding portion 22 of the fitting member 20 reaches the fitting space (inner fitting portion B) as illustrated in FIG. 5, the cutting tool T will be rotated as illustrated in FIG. 6 so as to cause the protruding portion 22 of the fitting member 20 to come into contact with the outer circumference of the pin 17 acting as the rotation preventing face Bx. Under this condition, the end portion of the protruding portion 22 is kept in contact with the slip-out preventing face By under the urging force of the spring 7. Further, as an alternative embodiment, instead of the spring 7, a female thread may be provided on the far side of the inner space 13 and a push-out bolt (a specific example of a rotation converting member) having a male thread as an urging mechanism may be provided to be threadingly fitted to the female thread, so that this push-out bolt may be placed in contact with the inner end of the shank portion 2. In the case of this configuration, in case the fitting member 20 is rotated in the direction to come into contact with the rotation preventing face Bx, the rotational force of the shank portion 2 of the cutting tool T is transmitted to the push-out bolt via the contact resistance, so that this push-out bolt will be rotated and in association with this rotation, the cutting tool T will be displace in the slip-out direction. With this, in case the cutting tool T is rotated in the direction for causing the fitting member 20 to come into contact with the rotation preventing face Bx, the end portion of the protruding portion 22 of the fitting member 20 will come into contact with the slip-out preventing face By, thereby to prevent relative rotation of the cutting tool T relative to the tool holder. Further alternatively, a friction assisting element can be interposed between the urging mechanism and the shank portion 2. In the case of this configuration, there is achieved improvement in the friction coefficient in the face that the urging mechanism comes into contact with the shank portion 2. Thus, the shank portion 2 can be readily synchronized with rotation of the urging mechanism, whereby the fitting member 20 can be brought into contact with the rotation preventing face Bx in a more reliable manner, thus preventing relative rotation of the cutting tool T relative to the tool holder.

After completion of the above-described setting, the fastener ring 5 will be rotated in the predetermined direction, whereby pressures will be applied from the multiple needle rollers 6 to the outer circumferential face 12S of the chuck portion 12, thus realizing diameter reduction of the inner space 13. With this diameter reduction, there is realized a condition that the outer circumference of the shank portion 2 of the cutting tool T is wrapped and surrounded in pressed contact by the inner circumferential face of the chuck portion 12 (inner circumferential face of the inner space 13).

After the above-described attachment, if there arises a situation of the cutting tool T tending to be rotated relative to the holder body 10 at the time of a cutting work by the cutting tool T, such relative rotation can be effectively prevented since the protruding portion 22 of the fitting member 20 is in contact with the pins 17 acting as the rotation preventing faces Bx. Further, when an external force is applied to the cutting tool T in the direction of slipping this tool T out of the holder body 10, such slip-out can be effectively prevented since the protruding portion 22 of the fitting member 20 is placed in contact with the slip-out preventing face By as illustrated in FIG. 7.

Further, in the case of the configuration that the rotation preventing face Bx is formed by the inner face of the inner space constituting the inner fitting portion B of the holder body 10, after the protruding portion 22 of the fitting member 20 reaches the fitting space (inner fitting portion B) as shown in FIG. 8, the cutting tool T will be rotated as shown in FIG. 9, whereby the protruding portion 22 of the fitting member 20 will be rendered in the attached state in contact with the rotation preventing face Bx formed in the inner face of the inner space of the inner fitting portion B. With this, if the cutting tool T is rotated in the direction to cause the fitting member 20 to come into contact with the rotation preventing face Bx, the protruding portion 22 of the fitting member 20 will be brought into direct contact with the rotation preventing face Bx formed in the chuck portion 12 (holder body 10), whereby relative rotation of the cutting tool T relative to the tool holder can be effectively prevented.

Especially, in the case of the above-described configuration, even when a cutting tool T having no outer fitting portion A in the shank portion 2 as specified by the standard is employed as the cutting tool T, such tool also can be used, with addition of only a minor work for rendering the shank portion 2 flat.

[Other Embodiments]

The present invention may be alternatively configured as follows, in addition to the foregoing embodiment.

Figure 10:
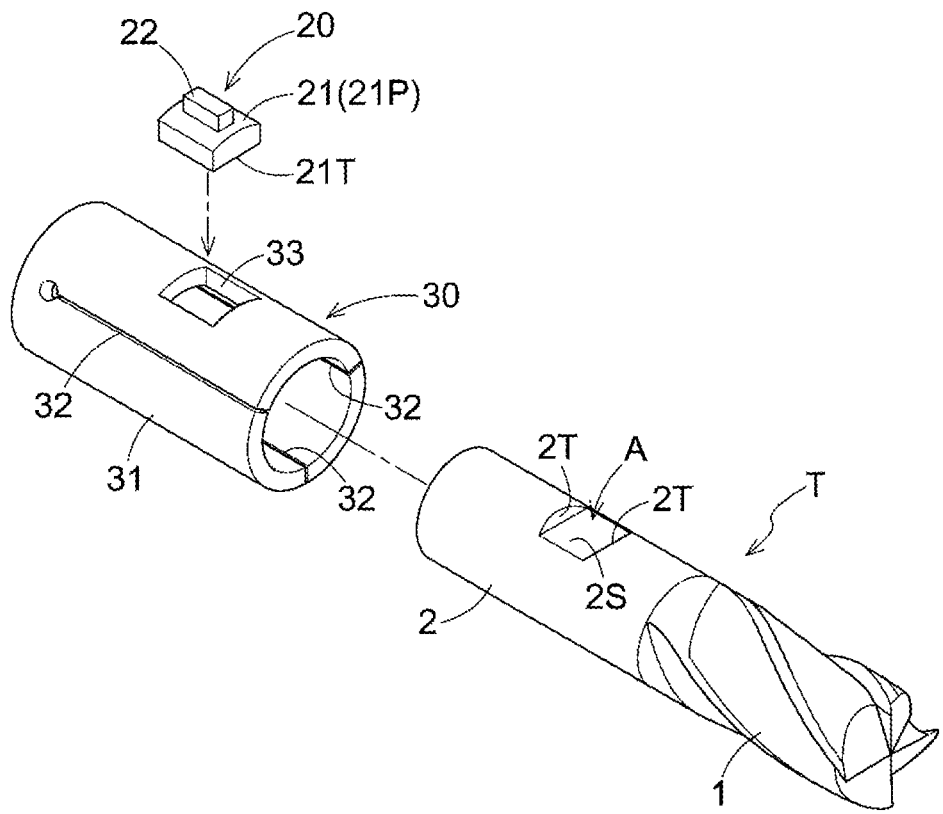
FIG. 10 is a perspective view showing a collet, a fitting member and a cutting tool in a further embodiment (a)
Figure 11:
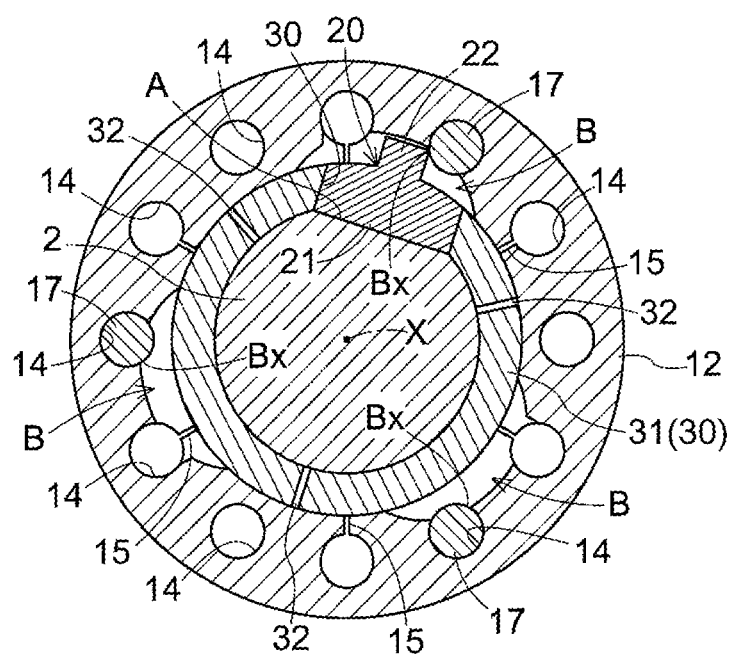
FIG. 11 is a section view showing the cutting tool, the fitting member, the collet, and a chuck portion in the further embodiment (a)

(a) As shown in FIG. 10 and FIG. 11, it is configured such that a small-diameter cutting tool T is supported via a collet 30. In this further embodiment (a), the tool holder as a tool holding structure includes the collet 30 and the embodiment can employ the same arrangement for the holder body 10. Also, the collet 30 is comprised of a tubular member 31 having an outside diameter that allows close gapless contact with the inner face of the inner space 13 and having also an inside diameter that allows close gapless contact with the outer circumference of the small-diameter cutting tool T. In the lateral face of this tubular member 31, a plurality of slit-like spaces 32 are formed and there is formed also a fitting hole portion 33 to which the fitting member 20 is to be fitted.

In this further embodiment (a), like the foregoing embodiment, the fitting member 20 will include the base portion 21 and the protruding portion 22. However, the thickness of the base portion 21 used in this further embodiment will be greater than the one used in the foregoing embodiment. Further, the embodiment can employ the configuration in which the outer circumference of the shank portion 2 of the cutting tool T includes the outer fitting portion A having the flat fitting face 2S as specified by the established standard.

With the above-described configuration, if there arises a situation at the time of a cutting work by the cutting tool T that the cutting tool T tends to be rotated relative to the holder body 10, as the protruding portion 22 of the fitting member 20 is placed in contact with the pin 17 acting as the rotation preventing face Bx, such relative rotation can be effectively prevented. Further, if an external force is applied to the cutting tool T which tends to slip this cutting tool T out of the holder body 10, such slip-out can be effectively prevented since the protruding portion 22 of the fitting member 20 is placed in contact with the slip-out preventing face By.

(b) A restricting face may be provided on the side opposite the slip-out preventing face By, so that the slip-out preventing face By and this restricting face disposed at the position opposite thereto, with forming whichever at least one of these slip-out preventing face By and the restricting face as an inclined face, may sandwich the protruding portion 22 therebetween for fixing this protruding portion 22 in position in the direction of axis X when the protruding portion 22 of the fitting member 20 comes into contact with the pin 17 acting as the rotation preventing face Bx if there arises a situation of the cutting tool T being rotated relative to the holder body 10.

Figure 12:
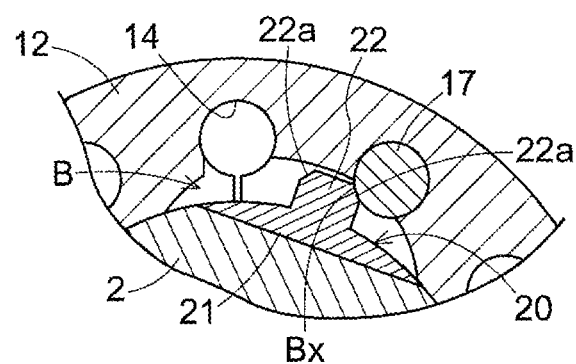
FIG. 12 is a section view showing a contact face of a protruding portion in a further embodiment (c).

(c) As shown in FIG. 12, a corner portion on the protruding side of the protruding portion 22 is chamfered to form a contact face 22a, so that when this protruding portion 22 comes into contact with the pin 17 acting as the rotation preventing face Bx, the contact face 22a may come into contact with the pin 17. With such formation of the contact face 22a, deformation of the corner portion is restricted, whereby extension of service lives of the fitting member 20 and the pin 17 can be realized. In the case of this configuration of the further embodiment (c) also, the rotation preventing face Bx to which the protruding portion 22 comes into contact may come into direct contact with the inner face of the inner space of the inner fitting portion B in the chuck portion 12 (holder body 10).

(d) In the foregoing embodiment, the shank portion 2 of the cutting tool T is fixed in the inner space 13 of the chuck portion 12 by means of pressure applied from the fastener ring 5. Instead of this, the fixing of the shuck portion 2 in the inner space 13 can be provided by shrink fitting, like the configuration disclosed in Patent Document 1.

In the case of the configuration implementing shrink fitting as in the further embodiment (d), the chuck portion 12 will be heated, so while this chuck portion 12 is thermally expanded, the protruding portion 22 of the fitting member 20 can be fed from the guide groove 18 to the fitting space. And, the shape of the fitting space can be configured such that after discharging the heat, the fitting space shape will not allow deformation in the direction from the fitting space toward the guide groove 18.

With the above-described configuration, relative rotation and slip-out of the cutting tool T relative to the holder body 10 can be prevented in a reliable manner.

INDUSTRIAL APPLICABILITY

The present invention is applicable to a tool holder configured to support a cutting tool T with use of a fitting member which is fitted to a shank portion of the cutting tool T and a fitting space of a chuck body.

DESCRIPTION OF REFERENCE MARKS/NUMERALS 2 shank portion
7 urging mechanism
12 chuck portion
13 inner space
14 hole portion
18 guide groove
20 fitting member
30 collet
A outer fitting portion
B inner fitting portion (fitting space)
Bx rotation preventing face
By slip-out preventing face
T cutting tool
X axis

The invention claimed is:

1. A tool holding structure, comprising:
  a fitting member to be in positional alignment with an outer fitting portion, which is recessed, provided in an outer face of a shank portion of a cutting tool, the fitting member detachably fitting in the outer fitting portion;

a chuck portion having a cylindrical inner face capable of receiving the shank portion and the fitting member;

a guide groove formed in the inner face and extending from an opening side end portion of the chuck portion toward a far side thereof, the far side being defined as opposite from an opening side at which the opening side end portion is positioned;

an inner fitting portion formed continuously with the guide groove to be fitted with the fitting member; and the inner fitting portion including a rotation preventing face to which the fitting member comes into contact in a direction of the shank portion being rotated relative to the chuck portion by a load of a cutting work and a slip-out preventing face to which the fitting member comes into contact in a direction of the shank portion being slipped out from the chuck portion;

wherein the rotation preventing face is constituted of a portion of a bar-like member exposed in the inner fitting portion as the bar-like member is inserted to a hole portion formed parallel with an axis of the chuck portion, from an end portion on the opening side end portion of the chuck portion.

2. The tool holding structure according to claim 1, wherein:

the chunk portion has a bottom at the far side, the structure further comprises an urging mechanism for urging the cutting tool, the urging mechanism being positioned between the bottom of the chunk portion and the cutting tool such that the urging mechanism pushes out this cutting tool toward the opening side; and the urging mechanism and the shank portion come into contact with each other, and contact resistance causes the urging mechanism and the shank portion to be rotated in unison.

* * * * *